2,950,237

PHOTOXIDATION PROCESSES UTILIZING NOVEL CATALYSTS

Dexter B. Sharp, Vandalia, Ohio, assignor to Monsanto Chemical Company, St. Louis, Mo., a corporation of Delaware No Drawing. Filed Nov. 13, 1957, Ser. No. 696,063

11 Claims. (Cl. 204—158)

The present invention is directed to photoxidation processes utilizing a porphyrin having aromatic meso-substitution as a photoxidation catalyst. The invention is particularly directed to photoxidation reactions employing $\alpha,\beta,\gamma,\delta$-tetraphenylporphyrins as photoxidation catalysts.

The invention is further directed to the photoxidation of olefins employing meso-aryl porphyrin catalysts. The invention is further directed to the photoxidation of propylene polymers, particularly propylene trimer, employing meso-aryl porphyrin catalysts.

In another aspect, the invention is directed to an improved method of preparing porphyrins by reacting pyrroles and aldehydes in the absence of solvent.

The invention is further directed to $\alpha,\beta,\gamma,\delta$-napthylporphin as a new compound.

The compounds suitable for use in the present invention will be in general conformity to the formula:

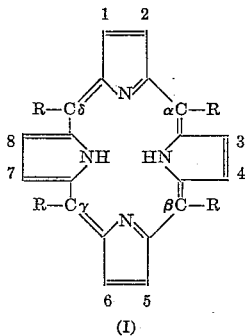

(I)

in which at least one R is an aryl group; any R's which are not aryl groups can be hydrogen or alkyl groups. R can be such monocyclic aryl or phenyl groups as, for example, phenyl, chlorophenyl, dichlorophenyl, methylphenyl, N,N-dimethylaminophenyl, hydroxyphenyl, etc., or any other phenyl groups. R can also be a di-, tri-, tetra-, or other polycyclic aryl group, for example, $\alpha$-naphthyl, $\beta$-naphthyl, anthracyl, phenanthryl, etc. While the presence of any one or more of the above or other aryl groups at the designated positions in the porphyrin leads to high activity as a photoxidizing catalyst, it is preferred to utilize four aryl groups in the catalysts. The tetraaryl porphyrins are more readily prepared, and also generally have greater photoxidizing activity than do catalysts containing a smaller number of aryl substituents. $\alpha,\beta,\gamma,\delta$-Tetraphenylporphin is a very effective photoxidation catalyst.

The $\alpha$, $\beta$, $\gamma$, and $\delta$ positions in the above formula are the meso positions; the catalysts for use in the process of the present invention can be designated as meso-aryl porphyrins, or as ms-aryl porphyrins.

In addition to the substituted phenyl groups noted above, the phenyl or aryl groups in the photosensitizing catalysts can have any or a combination of such substituents, for example, as alkyl groups; for example, methyl, ethyl, propyl, isopropyl, butyl, isobutyl, secondary butyl, tertiary butyl, n-amyl, isoamyl, tertiary amyl, n-hexyl, decyl, dodecyl, etc.; alkoxy substituents, for example, methoxy, ethoxy, isopropoxy, butoxy, hexyloxy, etc.; halogen substituents, for example, bromine, chlorine, fluorine, and iodine; and any other substituents which do not change the fundamental aromatic character of the groups. Of course, the porphyrins can have substituents at other positions, particularly at the numbered positions in the above formula, for example, such substituents as ethyl, methyl, vinyl, and propionic acid groups, etc., or phenyl groups, including any of the substituted phenyl groups referred to hereinbefore.

It will be understood that the use of the metal chelate forms of the above structure is also included in the present invention. Such metals as, for example, zinc, magnesium, copper, iron, nickel, cobalt, lead, etc. can readily be chelated with porphyrins, and the resulting chelates are effective as photosensitizers. The chelates can be represented by the above porphyrin structure, with the following bonding between the metal and the pyrrole nitrogens.

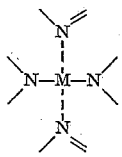

Various other metals also form chelates of the described porphyrins which are effective as catalysts, for example, alkali and alkaline earth metals such as sodium, potassium, calcium, etc. It will be understood that when porphyrins are described or claimed herein, generically or specifically, by structural formula or otherwise, the metal chelate forms as well as the free bases are contemplated.

The prior art discloses the use of chlorophyll as a catalyst in certain photoxidation procedures. However, chlorophyll does not have the aromatic activated porphyrin structure of the catalysts used in the present invention and is far inferior in activity and stability to the catalysts of the present invention.

It is an object of the present invention to improve the efficiency and yields in photoxidation reactions by the use of superior photosensitizing catalysts. It is a further object to render photoxidation procedures more practical and economical by the use of photosensitizers of improved stability. It is a further object to employ photosensitizers having good solubility in organic substrates. It is a further object to utilize superior photosensitizers which can be prepared by procedures of organic synthesis.

The terms "photoxidizing," "photoxidation," "photosensitized," etc., as used herein in the specification and claims are intended to cover true photosensitized oxidation reactions in which light in the presence of a photosensitizing catalyst causes the oxidation; the terms are not intended to include autoxidations, or oxidations proceeding by a free radical mechanism in which irradiation with light serves to initiate free radicals. The true photosensitized oxidation reactions are characterized by the fact that the rate of the reaction is proportional to the intensity of irradiation at both high and low intensities, and the fact that ordinary oxidation inhibitors do not retard the reaction.

The photoxidation reaction of the present invention can be postulated according to the following equations:

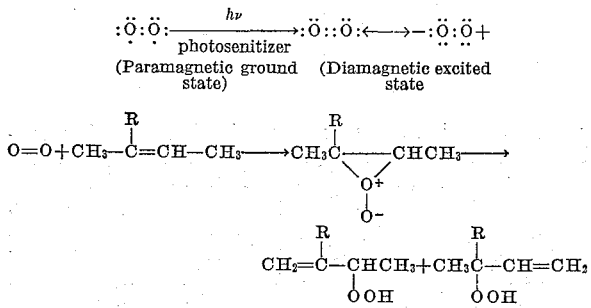

In these reactions a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of about 3600 to about 8000 Angstroms has been found very suitable. While light in the ultraviolet region, particularly the near ultraviolet region, can be used as it is effective to some extent in causing photoxidation, it is desirable to avoid use of light in these regions as it tends to catalyze auto-oxidations and other free-radical type reactions. High-energy ultraviolet light may also cause accelerated catalyst photo-decomposition. The speed of the photoxidation reaction is proportional to the intensity of the irradiation; this relationship is very important, as it makes it possible to obtain reaction rates suitable for commercial production by merely providing high power light sources.

The amount of meso-aryl porphyrin photosensitizer can vary widely, but ordinarily only small "catalytic" amounts will be used. For example, amounts of 0.005% by weight based on the weight of substrate are satisfactory. Various other amounts, for example, from about 0.0001% up to about 1% or more by weight of substrate such as propylene trimer or other olefin can be used. The photoxidation will generally be conducted in the absence of solvent. However, various organic solvents can be used for the reaction, and even water may be present during the reaction. The use of solvent will be advantageous in some cases to aid the mutual intersolubility of substrate and particular meso-aryl porphyrin photosensitizers. Examples of a few suitable solvents are aromatic hydrocarbons, such as benzene, toluene, etc.; acylic and cyclic alkanes, for example, n-hexane and cyclohexane; amines, for example, pyridine, etc. Temperature does not have a strong influence on the photoxidation reaction. However, it is desirable to keep the substrate in the liquid or solution state, usually by temperatures below the boiling point at atmospheric pressure. Temperatures of the order of room temperature, for example, 20 to 30° C. will generally be used. Other temperatures, for example, from below 0° to 100° C. or higher, can be used; if desired, the reaction can be conducted at superatmospheric pressures to maintain the liquid state at higher temperatures.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the substrate, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of substrate; it will be understood that the term "oxygen" as used in the present specification and claims includes molecular oxygen in air or in admixture with other gases, or dissolved in or admixed with liquids, or generated in situ, as well as oxygen per se.

The photoxidation process of the present invention can be applied to any photoxidizable substrates; the inventive feature of the process is essentially the discovery of the superior photosensitizing activity of the catalysts described herein, and this photosensitizing activity is valuable in the photoxidation of any substrates. Representative substrates are, for example, such open chain (aliphatic) and cyclic mono-olefins as 1-heptene, 1-octene, 1-dodecene, 1-hexadecene, diisobutylene, cyclopentene, 1-methyl-1-cyclopentene, cyclohexene, 1-methyl-cyclohexene, 1,2-dimethylcyclohexene, cyclooctene, α-pinene, dipentene, limonene, carvomenthene, terpinolene, propylene trimers, tetramers, pentamers, etc., all of which are photoxidized to hydroperoxides, presumably by means of an allylic shift as represented by:

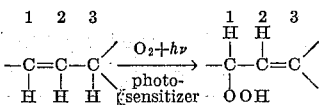

The hydroperoxide products can readily be reduced to alcohols, or used in other ways as organic intermediates for the production of useful compounds. The photoxidation process of the present invention converts cyclic conjugated dienes to endocyclic peroxides, and open chain conjugated dienes to exocyclic peroxides; representative of dienes which are so converted are, for example, cyclopentadiene, 1,3-cyclohexadiene, 2-methyl-1,3-cyclohexadiene, α-terpinene, α-phellandrene, α-pyronene, β-pyronene, 1,3-hexadiene, 1,3-dimethylbutadiene, 2,3-dimethylbutadiene, alloocimene, etc. Other substrates which can be photoxidized in the process of the present invention are, for example, amines; thioreas, e.g., thiourea; dienes of the sterol series, e.g., ergosterol; heterocyclic olefins, e.g., furans; triolefins; olefinic acids, e.g., oleic acid; fulvenes, e.g., phenylfulvene; aldehydes; phenylhydrazones, semicarbazones; thiosemicarbazones; enol ethers; sulfinic acids; etc.; such groups as ester, amide, urethane, n-acetyl, phenyl, hydroxyl, Cl, Br, etc., even if adjacent to the oxidizable group in the foregoing types of substrates, do not ordinarily interfere in the photoxidation reaction. It will be appreciated, of course, that the foregoing substrates will vary in their ease of photoxidation, photoxidation rates, etc., and in the products resulting from photoxidation; such variations, however, do not affect the photosensitizing activity of the meso-aryl porphyrin catalysts in the photoxidation reactions. It is evident from the foregoing, however, that the present process concerns introducing oxygen into the molecule of the organic compound without destruction thereof, i.e., actual addition of the oxygen to the compound, as a result of subjecting the organic compound capable of adding oxygen under the influence of light and a photosensitizing catalyst to simultaneous light irradiation and contact with oxygen and an α,β,γ,δ-tetraphenylporphyrin.

The propylene polymers referred to above are unsaturated olefins obtained by polymerization of propylene. In particular, propylene trimer used as the substrate, in several examples below, was obtained by acid-catalyzed homoaddition of propylene to itself. The general method involves passage of propylene at superatmospheric pressure over a phosphoric acid-impregnated solid support at temperatures greater than 100° C., collecting the polymerized hydrocarbon and fractionating to isolate the trimer, tetramer, pentamer, etc., fractions. The trimer utilized herein was obtained from Enjay Company and has a boiling range of 260–290° F., and sp. gr. 20/20 of 0.736–0.740. A minimum of 100 p.p.m. t-butylcatechol is added as oxidation inhibitor. In early photoxidation runs, this was removed by adsorption, but the photoxidation proceeds equally as well in its presence or absence. The propylene pentamer used also was obtained from Enjay and has the following properties: Enjay "pentadecene"; sample No. 19-E-1; B.P., 249-268° C.; API gravity of 60° F., 41.7. Propylene tetramer used was Enjay "tetrapropylene" and has B.P. 350-445° F., sp. gr. 20/20 of 0.768-0.781.

The following examples illustrate certain embodiments of the invention, but the invention is not to be considered as limited thereto.

EXAMPLE 1

Example 1 illustrates the efficiency of the meso-aryl porphyrin photosensitizing catalysts utilized in the present inventive process, as compared to prior art photosensitizing catalysts.

A conventional 20-unit Precision Scientific Warburg apparatus was provided with a double-circle, 5000-volt, "standard cool white" fluorescent light especially fabricated to fit the apparatus. The light was immersed in the constant-temperature water bath to provide uniform illumination of the Warburg vessels from below. Sufficient amounts of the catalysts were dissolved in 10-ml. portions of pyridine to provide stock solutions having $1.75 \times 10^{-3}$ moles of catalyst per liter of solvent. Individual Warburg vessels were then charged with a pyridine solution of propylene trimer, each charge containing 0.32 ml. of propylene trimer and 2.48 ml. of pyridine. A 0.2-ml. portion of a stock solution of catalyst was added to each of the test vessels, and the oxygen uptake of the vessels was then measured as a function of time under illumination. Catalyst concentration in each test vessel is $1.14 \times 10^{-4}$ moles per liter at these dilutions. Total liquid volume in each vessel was 3.0 ml. The thermobarometer contained 0.32 ml. of propylene trimer and 2.68 ml. of pyridine, but no catalyst.

*Oxygen absorbed in microliters*

| Catalyst | Time in Minutes | | | |
|---|---|---|---|---|
| | 15 | 30 | 45 | 60 |
| $\alpha,\beta,\gamma,\delta$-Tetraphenylporphin | 74 | 156 | 236 | 317 |
| Methyl Violet B | −1 | −1 | −1 | −1 |
| Tetrabromofluorescein sodium salt (Eosine) | 10 | 26 | 36 | 49 |
| Fluorescein sodium salt | −1 | 3 | 3 | 4 |
| Brilliant indocyanine 6 BA CF | −1 | −2 | −4 | −1 |

It is readily apparent that the tetraphenylporphin is far superior in photosensitizing activity to any of the other catalysts employed above.

EXAMPLE 2

The following compounds in the specified amounts were made up to 100 ml. in propylene trimer (free of inhibitors).

| Solution No. | Compound | Weight (mg.) |
|---|---|---|
| 1 | $\alpha,\beta,\gamma,\delta$-Tetraphenylporphin | 7.2 |
| 2 | $\alpha,\beta,\gamma,\delta$-Tetrakis(2,4-dichlorophenyl)porphin | 10.4 |
| 3 | $\alpha,\beta,\gamma,\delta$-Tetrakis(3,4-dichlorophenyl)porphin | 10.4 |
| 4 | $\alpha,\beta,\gamma,\delta$-Tetrakis(2-furyl)porphin | 6.7 |
| 5 | $\alpha,\beta,\gamma,\delta$-Tetrakis(4-methoxyphenyl)porphin | 8.6 |
| 6 | $\alpha,\beta,\gamma,\delta$-Tetrakis(4-methylphenyl)porphin | 7.8 |
| 7 | $\alpha,\beta,\gamma,\delta$-Tetrakis(1-naphthyl)porphin | 9.5 |
| 8 | $\alpha,\beta,\gamma,\delta$-Tetrakis(2-thienyl)porphin | 7.5 |

Solution was caused by gentle warming. With solutions 3, 4, 5, 7 and 8, the solid compounds were added to benzene (all but 4 dissolved) prior to addition to the propylene trimer in order to bring about solution. The solutions were intended to provide a catalyst concentration of about $1.17 \times 10^{-4}$ moles per liter. Portions of the solutions, 3 ml., were then placed in the vessels of the Warburg apparatus of Example 1, and the oxygen uptake under illumination was measured at 25° C., as recorded below:

*Oxygen absorbed in microliters*

| Solution No. | Time in Minutes | | | | |
|---|---|---|---|---|---|
| | 15 | 25 | 45 | 60 | 75 (Dark) |
| 1 | 98 | 192 | 325 | 448 | 453 |
| 2 | 92 | 177 | 303 | 414 | 419 |
| 3 | 98 | 188 | 322 | 435 | 451 |
| 4 | 64 | 113 | 187 | 251 | 267 |
| 5 | 36 | 67 | 116 | 161 | 167 |
| 6 | 86 | 152 | 277 | 374 | 379 |
| 7 | 135 | 234 | 424 | 567 | 589 |
| 8 | 146 | 293 | 445 | 584 | 609 |

EXAMPLE 3

Solutions of the following compounds in the following amounts were made up to 10 ml. with pyridine.

| Solution No. | Compound | Weight (mg.) |
|---|---|---|
| 1 | $\alpha,\beta,\gamma,\delta$-Tetraphenylporphin | 10.8 |
| 2 | $\alpha,\beta,\gamma,\delta$-Tetraphenylporphin zinc complex | 11.9 |
| 3 | $\alpha,\beta,\gamma,\delta$-Tetrakis(4-hydroxyphenyl)porphin | 11.9 |
| 4 | $\alpha,\beta,\gamma,\delta$-Tetrakis(2-hydroxyphenyl)porphin | 11.9 |

Portions, 0.2 ml., of the catalyst solutions were then made up to 3 ml. with a 50:90 (by volume) mixture of propylene trimer and pyridine, and the oxygen uptake of these solutions was then measured in the Warburg apparatus in order to compare the photosensitizing activity of the catalysts.

*Oxygen absorbed in microliters*

| Solution No. | Time in Minutes | | | |
|---|---|---|---|---|
| | 15 | 32 | 45 | 60 |
| 1 | 91 | 231 | 327 | 447 |
| 2 | 42 | 198 | 299 | 436 |
| 3 | 53 | 143 | 202 | 277 |
| 4 | 36 | 105 | 150 | 203 |

The above data indicate that the metal salts (in this case, zinc salts) as well as the free bases are active photosensitizers.

EXAMPLE 4

To prepare solutions suitable for the determination of the effect of chelate formation on the photosensitizing activity of the catalysts, solutions containing slight molar excesses of different metal ions were added to tetraphenylporphin solutions (about $5 \times 10^{-7}$ mole of metal ion to $3.5 \times 10^{-7}$ mole of porphyrin). The metal ions in salt form were first dissolved in n-butanol to form 1% by weight solutions, and 0.01 ml. of this solution was then added to a solution containing 2.4 ml. n-butanol, and 0.6 ml. of an 0.05% solution of tetraphenylporphin in propylene trimer. The following metal salts were utilized: $Mg(OAc)_2 \cdot 4H_2O$, $FeCl_2 \cdot 4H_2O$, $Cu(OAc)_2 \cdot H_2O$, $Zn(OAc)_2 \cdot 2H_2O$, cobalt naphthenate. Photoxidation at 25° C. in the Warburg gave the following results:

*Oxygen absorption in microliters*

| Metal Ion | Time in Minutes | | | | |
|---|---|---|---|---|---|
| | 10 | 21 | 30 | 40 | 50 (Dark) |
| None | 16 | 50 | 90 | 131 | 133 |
| $Co^{++}$ | 46 | 113 | 169 | 236 | 262 |
| $Mg^{++}$ | 15 | 58 | 89 | 130 | 131 |
| $Fe^{++(+)}$ | 39 | 104 | 159 | 220 | 237 |
| $Cu^{++}$ | 12 | 45 | 68 | 96 | 91 |
| $Zn^{++}$ | 20 | 70 | 111 | 154 | 156 |

The data indicate that the metal-chelated forms of tetraphenylporphin are active photosensitizers, although copper has some inhibitory effect. The substantial reaction in the dark for the iron- and cobalt-containing catalysts in the last 10 minutes of the run indicates that the photoxidation rates for these catalysts should be corrected, e.g., to 132 at 40 minutes for the cobalt-containing catalyst and 152 at 40 minutes for the iron-containing catalysts. Other chelating metals, e.g., nickel, can similarly be present in the catalysts without destroying their photosensitizing effect.

EXAMPLE 5

Pentapropylene (pentadecene, Enjay), 1650 grams, and 0.165 gram of $\alpha,\beta,\gamma,\delta$-tetraphenylporphin in about 30 ml. hot benzene were placed in a flat-sided, half-gallon reactor illuminated by a high-pressure mercury arc lamp (AH-6). Oxygen was metered into the flask and the photoxidation rate was as follows:

| Time (hours): | Percent pentapropylene reacted |
|---|---|
| 1.0 | 7.2 |
| 2.0 | 13.3 |
| 3.25 | 22.7 |
| 5.0 | 34.7 |

The percent of polypropylene reacted was calculated from the moles of oxygen absorbed as measured by the difference between the moles of oxygen metered into the reaction flask and those leaving the flask, assuming that one molecule of oxygen converted one molecule of pentapropylene to its hydroperoxide. In the above reaction, after two hours, illumination was increased by the addition of two 500-watt photospot tungsten lamps (G.E. RSP2).

EXAMPLE 6

In a Warburg apparatus, the following olefins were photoxidized in air in the presence of the designated catalysts:

| Sample No. | Olefin | Catalyst |
|---|---|---|
| 1 | 2-methyl-2-butene | tetraphenylporphin. |
| 2 | 2,3,3-trimethyl-1-butene | Do. |
| 3 | 4,4-dimethyl-cis-2-pentene | Do. |
| 4 | propylene trimer | $\alpha,\beta,\gamma,\delta$-tetrakis(4-nitrophenyl)porphin. |
| 5 | do | zinc $\alpha,\beta,\gamma,\delta$-tetrakis(4-dimethylaminophenyl)porphin. |

The olefins were used in an amount of 0.2 ml. and a 0.2 ml. pyridine solution of the catalysts was used ($1.17 \times 10^{-4}$ moles per liter); pyridine, 2.6 ml., was added to bring the total solution up to about 3 ml. The reaction rates were as follows.

*Oxygen absorbed in microliters*

| Sample No. | Time in Minutes | | | | |
|---|---|---|---|---|---|
| | 15 | 30 | 40 | 60 | 75 (Dark) |
| 1 | 96 | 196 | 299 | 398 | 398 |
| 2 | 9 | 13 | 20 | 22 | 21 |
| 3 | 11 | 17 | 22 | 23 | 19 |
| 4 | 42 | 93 | 142 | 191 | 179 |
| 5 | 89 | 179 | 270 | 357 | 309 |

It will be noted that 2-methyl-2-butene (No. 1) has a very rapid photoxidation rate, particularly as compared to the terminal olefins and to other olefins having few hydrogens or carbons adjacent to the olefinic double bond. The photosensitizing activity of 4-nitrophenyl- and of 4-dimethylaminophenylporphin is demonstrated.

EXAMPLE 7

Thiourea was photoxidized in the Warburg for one hour in pyridine solution in the presence of tetraphenylporphin with the following results:

| Thiourea Concentration (in mole/liter) | Tetraphenylporphin Concentration (in mole/liter) | Oxygen Absorbed (microliters) |
|---|---|---|
| $9.55 \times 10^{-4}$ | $1.17 \times 10^{-4}$ | 485 |
| $4.77 \times 10^{-4}$ | $1.17 \times 10^{-4}$ | 410 |
| $1.91 \times 10^{-4}$ | $1.17 \times 10^{-4}$ | 411 |
| $0.191 \times 10^{-4}$ | $1.17 \times 10^{-4}$ | 360 |
| $4.77 \times 10^{-4}$ | $11.7 \times 10^{-4}$ | 620 |
| $4.77 \times 10^{-4}$ | $0.117 \times 10^{-4}$ | 103 |

The data demonstrate that tetraphenylporphin is very effective in photosensitizing the photoxidation of thiourea, even at catalyst concentrations as low as $0.117 \times 10^{-4}$ mole per liter. Thiourea has been used as substrate for an actinometer (Warburg and Schocken, Arch. Biochem., 21, 363 (1949); Burk and Warburg, Z. Naturforsch., 6b, 12 (1951). The marked effect of catalyst concentration on the photoxidation rate is also of interest and is related to degree of light absorption.

EXAMPLE 8

A series of oleic acid photoxidations was carried out under comparable conditions to compare the photocatalytic effectiveness of $\alpha,\beta,\gamma,\delta$-tetraphenylporphin with that of chlorophyll. Pure chlorophyll was isolated by the method of Zscheile and Comar (Botan. Gaz., 102, 463 (1941)), and the mixture of chlorophyll-a and -b was used in the evaluation experiment. Crude chlorophyll was obtained from the Strong Cobb Company, Lake Worth, Florida; designated as Lot No. B-1505, crude chlorophyll, 8.43% assay as chlorophyll. The following table shows the marked photocatalytic superiority of the meso-aryl porphyrin as compared to natural chlorophyll. The percent oxidation at 1 hour is given for each run.

| Run No. | Catalyst, Wt. Percent Concen. | Percent Oxidation in 1 hour |
|---|---|---|
| 1 | $\alpha,\beta,\gamma,\delta$-Tetraphenylporphin, 0.063 | 41.5 |
| 2 | $\alpha,\beta,\gamma,\delta$-Tetraphenylporphin, 0.010 | 17.8 |
| 3 | Pure Chlorophyll-a and -b, 0.025 | 12.5 |
| 4 | Crude Chlorophyll, 0.182 | 7.5 |

As is noted, the tetraphenylporphin (run No. 1) at one-third the concentration of crude chlorophyll (run No. 4) is over five times as efficient as a photocatalyst. When compared with pure chlorophyll (run No. 3), the synthetic catalyst (run No. 2) at only four-tenths the concentration of pure chlorophyll gives a photoxidation rate 1.4 times that of the pure chlorophyll.

EXAMPLE 9

To 1500 grams of triolein (Carlisle Chemical Company, Lot 12652), 1.698 moles, was added 0.73 gram tetraphenylporphin in 30 ml. hot pyridine. The flask was irradiated by four lights (using a total of 2.365 kilowatts per hour) and oxygen was passed into the flask. The percent photoxidation (based on 3 reactive olefin groups) was as follows:

| Time (hours): | Percent photoxidation |
|---|---|
| 1 | 23.4 |
| 12.5 | 63 |
| 18.25 | 79.8 |
| 20.5 | 84.5 |

Analysis of the crude oxidation mixture: Found—C, 70.10; H, 11.06; O, 18.84. Calculated for $C_{57}H_{104}O_6$—C, 77.32; H, 11.84; O, 10.84. Calculated for $C_{57}H_{104}O_{12}$—C, 69.75; H, 10.68; O, 19.57. The oxygen percentage indicates about 92% conversion to the compound with 3 hydroperoxide groups per molecule (with some error due to the presence of about 30 ml. pyridine).

EXAMPLE 10

In a photoxidation of oleic acid in pyridine solution with a chlorophyll as catalyst, the starting concentration of chlorophyll was 0.021 gram in 400 ml. solution, or $5.9 \times 10^{-5}$ mole per liter. Spectrum of the band at 664 m$\mu$ indicated a concentration of $5.8 \times 10^{-5}$ mole per liter. The spectrum of the same band after a 5.5-hour photoxidation indicated a $9.2 \times 10^{-6}$ mole per liter concentration, or an 84.4% loss of chlorophyll during the photoxidation. Using the Soret band (437 m$\mu$) for the determination ($E = 1.05 \times 10^5$), 67% of the chlorophyll was lost in 3.8 hours, and 75% in 5.5 hours.

EXAMPLE 11

In the photoxidation of propylene trimer, the original concentration (gravimetric) of $\alpha,\beta,\gamma,\delta$-tetraphenylporphin was $2.29 \times 10^{-4}$ mole per liter and the final concentration (spectral analysis) at 3.8 hours was $1.44 \times 10^{-4}$ mole per liter, indicating only a 37% loss in 3.8 hours. The concentration was determined with a 415 m$\mu$ band (the optical density, $D_{415}$ at $\frac{1}{100}$ dilution equaled 0.69; $E_{415} = 4.8 \times 10^5$).

The above example considered with Example 10 indicates that tetraphenylporphin is much more stable than chlorophyll under photoxidation conditions.

EXAMPLE 12

Solutions of hemin, tetraphenylporphin, and a water-soluble Na-K-Cu chlorophyllin were made up by forming 0.1% solutions in pyridine propylene trimer. The amount of oxygen absorbed (in microliters) during photoxidation in the Warburg for one hour, after correction for absorption in the absence of light (which was considerable in the case of hemin), was as follows:

Hemin (EK Co. 2203) _____ 69
Tetraphenylporphin _____ 498
Na-K-Cu chlorophyllin (American Chlorophyll Co.; WEM—79.5%; Lake Worth, Florida; Lot B-1505) _____ None The tetraphenylporphin above was a fraction obtained from the reaction in bulk of pyrrole and benzaldehyde in a sealed tube; the fraction as eluted from the chromatogram, probably a mixture of isomers of chlorines and porphyrins, was yellow, but immediately changed to a dark purple upon exposure to sunlight.

EXAMPLE 13.—(SHOWING LACK OF INHIBITOR EFFECT ON PHOTOXIDATION)

Propylene trimer containing t-butylcatechol as oxidation inhibitor was passed through a six-inch column of type H activated alumina (Peter Spence and Sons, Ltd.), to remove the t-butylcatechol. A 207-g. portion of this inhibtor-free propylene trimer containing 0.04 g. of $\alpha,\beta,\gamma,\delta$-tetraphenylporphin was photoxidized in a 300-ml. flat-sided flask in a glass water-bath, using two G.E. RSP2 photospots for irradiation. Similarly, a 200-g. portion of inhibitor-containing (100 p.p.m. min. of t-butylcatechol) propylene trimer containing 0.04 g. of $\alpha,\beta,\gamma,\delta$-tetraphenylporphin was photoxidized under identical conditions. In each case, the photosensitizer catalyst was added in 3.5–5 ml. of hot pyridine to facilitate solution. Comparative photoxidation data are as follows:

| Time (Hours) | Percent Oxidation | |
|---|---|---|
| | With TBC[1] | Without TBC[1] |
| 1.0 | 18.6 | 15.3 |
| 2.0 | 35.3 | 31.9 |
| 3.0 | 49.5 | 45.3 |

[1] t-Butylcatechol.

This shows that the t-butylcatechol has no inhibiting effect on this photoxidation; in fact, inhibitor-free trimer photoxidizes at a slightly lower rate than "inhibited" trimer.

There follows a list of various photosensitizing catalysts of the type utilized in the present invention, together with their photoxidation catalyzing rates as measured by oxygen absorption of propylene trimer under standard illumination. As the conditions under which these rates were determined varied somewhat, the rates are not directly comparable with each other; however, the rates serve to indicate the generally high photosensitizing activity of the porphyrins containing aromatic or conjugated unsaturated heterocyclic substituents as contrasted on a molar basis with natural materials, such as hemin.

| Catalyst | Amount (microliters) of Oxygen Absorbed per Hour (Corrected for Dark Reaction) |
|---|---|
| $\alpha,\beta,\gamma,\delta$-Tetraphenylporphin | 428 |
| $\alpha,\beta,\gamma,\delta$-Tetrakis(2,4-dichlorophenyl)porphin | 381 |
| $\alpha,\beta,\gamma,\delta$-Tetrakis(3,4-dichlorophenyl)porphin | 350 |
| $\alpha,\beta,\gamma,\delta$-Tetrakis(2-furyl)porphin | 171 |
| $\alpha,\beta,\gamma,\delta$-Tetrakis(4-methoxyphenyl)porphin | 111 |
| $\alpha,\beta,\gamma,\delta$-Tetrakis(4-methylphenyl)porphin | 353 |
| $\alpha,\beta,\gamma,\delta$-Tetrakis(1-naphthyl)porphin | 448 |
| $\alpha,\beta,\gamma,\delta$-Tetrakis(2-thienyl)porphin | 418 |
| $\alpha,\beta,\gamma,\delta$-Tetraphenylporphin zinc complex | 415 |
| $\alpha,\beta,\gamma,\delta$-Tetrakis(4-hydroxyphenyl)porphin | 261 |
| $\alpha,\beta,\gamma,\delta$-Tetrakis(2-hydroxyphenyl)porphin | 169 |
| Hemin[1] | 56 |
| Tetraphenylporphin (crude mixture) | 496 |
| $\alpha,\beta,\gamma,\delta$-Tetrakis(4-nitrophenyl)porphin | 179 |
| $\alpha,\beta,\gamma,\delta$-Tetrakis(4-N,N-dimethylaminophenyl)porphin zinc complex | 303 |

[1] Hemin does not have the structure of the compounds utilized in the present invention.

The following examples illustrate procedures which can be used in preparing the meso-aryl porphyrins (see Formula I) utilized in the photoxidation procedures of the present invention. In general, the meso-aryl porphyrins are prepared by reaction of pyrrole with a particular aromatic aldehyde to obtain the corresponding meso-aromatic substituted porphyrin (Ball, Dorough and Calvin, J. Am. Chem. Soc., 68, 2278 (1946)). Various porphyrin derivatives can be obtained by simply employing substituted benzaldehydes or substituted pyrroles in their preparation. Or, alternatively, various aryl-substituted compounds can be employed which will condense to form the pyrrole rings as well as the great porphyrin ring (Linstead et al., J. Chem. Soc., 1937, 929; 1940, 1079). For example, $\alpha,\alpha'$-diphenylmaleimide will condense upon heating in the presence of zinc, copper, or magnesium salts or oxides, for example, cuprous chloride or magnesium oxide, in particular, with zinc phenylacetate to $\alpha,\beta,\gamma,\delta,1,2,3,4,5,6,7,8$-dodecaphenylporphyrin (Helberger and Rebay, Ann., 536, 181 (1938)). In preparing the porphyrins, mixtures of substituted and unsubstituted pyrroles, benzaldehydes or other reactants can be employed to obtain porphyrins containing various combinations of substituted and unsubstituted pyrrole groups, and substituted and unsubstituted phenyl groups. Examples of a few of the meso-aryl porphyrins applicable as photoxidation catalysts in my process, in addition to those disclosed in the examples above are:

1,5-dimethyl-$\alpha,\beta,\gamma,\delta$-tetraphenylporphyrin,
$\alpha,\beta,\gamma,\delta$-tetrakis-(4-hydroxyphenyl)-3,4,7,8-tetraphenylporphin,
1,3,5,8-tetraisopropyl-$\alpha,\beta,\gamma,\delta$-tetraphenylporphin,
1,3,5,8-tetraethyl-$\alpha$-phenylporphin,
1,3,5,8-tetramethyl-$\alpha,\gamma$-diphenylporphin,
$\alpha,\beta,\gamma,\delta,1,2,3,4,5,6,7,8$-dodecakis(2,4-dichlorophenyl)porphin, etc.

EXAMPLE 14

Each of three Carius tubes was charged with 20 ml. pyridine, 10 grams zinc acetate, and 10 ml. pyrrole. Each of the tubes was then charged with one of the following aldehydes in the stated amount: anisaldehyde—18 ml., 1-naphthaldehyde—20 ml., 2-thiophenecarboxaldehyde—14 ml. Each tube was then flushed with nitrogen, sealed, and heated in a furnace at 200° C. for 48 hours.

The tube containing the reaction product of pyrrole and anisaldehyde was opened and the contents were transferred to a beaker with about 300 ml. chloroform. Hydrochloric acid (37 ml. $H_2O$ to 63 ml. concentrated hydrochloric acid) was added with stirring, followed by 65 ml. concentrated $NH_4OH$; the separation of the phases was poor because of emulsion formation. The liquids were restirred with hydrochloric acid (20 ml. $H_2O$:40 ml. concentrated hydrochloric acid). The chloroform layer was separated, stirred with 30 ml. $NH_4OH$, and again separated. The chloroform solution was evaporated to about 100 ml. and chromatographed on an alumina column (Alcoa F–1, 48–100 mesh). Blue crystals separated at the top of the column. The material was eluted with chloroform, and the chloroform eluate was evaporated to give a gummy solid. The solid was dissolved in chloroform and the resulting solution was filtered; upon evaporation of the chloroform from the filtrate, 1.91 grams of blue crystalline $\alpha,\beta,\gamma,\delta$-tetrakis (4-methoxyphenyl)porphyrin was obtained.

The tube containing the naphthaldehyde-pyrrole reaction product was opened and the contents were rinsed into a beaker with 200–300 ml. chloroform. Hydrochloric acid, 100 ml. (37 ml. $H_2O$:63 ml. concentrated hydrochloric acid), was stirred into the chloroform. The chloroform phase was separated, washed, and stirred with 50 ml. concentrated $NH_4OH$. Water was added to give a good separation. The chloroform solution was chromatographed on alumina (Alcoa F–1 $Al_2O_3$, 48–100 mesh); evaporation of chloroform eluate from the chromatogram gave a gummy material which was redissolved in a minimal amount of chloroform, again isolated by evaporation of the chloroform, dissolved in additional chloroform, and run through an $Al_2O_3$ column (top half, Alcoa F–1, 48–100 mesh; bottom half, Alcoa F–20); evaporation of the first chloroform eluate fraction gave 2.1 grams of violet solid $\alpha,\beta,\gamma,\delta$-tetrakis (1-naphthyl)porphyrin, and evaporation of the second fraction gave 4.07 grams of similar solids.

The tube containing the product of the reaction of 2-thiophenecarboxaldehyde and pyrrole was opened, rinsed with acetone, and filtered. The crystalline solids were dissolved in chloroform and stirred with 100 ml. aqueous hydrochloric acid. Concentrated ammonium hydroxide was then added, and the chloroform layer was separated and chromatographed on $Al_2O_3$. Evaporation of the first eluate fraction gave 1.1 grams of blue-purple solid $\alpha,\beta,\gamma,\delta$-tetrakis($\alpha$-thienyl)porphyrin, while evaporation of the second eluate gave 2.27 grams of this product.

EXAMPLE 15

In a Pyrex Carius tube were placed 20 grams zinc acetate, 34 ml. (0.32 mole) benzaldehyde, and 22 ml. pyrrole (0.32 mole). The tube was flushed with nitrogen, sealed, and heated at 200° C. for 48 hours. The tube, which now contained large crystals, was opened and the contents were removed in chloroform, and 1.64 grams of blue zinc $\alpha,\beta,\gamma,\delta$-tetraphenylporphin crystals was obtained by filtration. The chloroform was evaporated from the filtrate, and 500 ml. methanol was added to the residue, heated to reflux, and filtered from the tarry residue; the methanol extraction was repeated twice more, and the methanol was then evaporated from the extracts, and the residue was pulverized and extracted overnight in a Soxhlet extractor with acetone-ether solution (5% by volume acetone). The extracts were evaporated to give a purple solid; the Soxhlet boiler was charged with chloroform and extraction was continued. The Soxhlet extracts were dissolved in chloroform and chromatographed on $Al_2O_3$ (Alcoa F–1 grade). Some yellow forerun was obtained which was readily photoxidizable to the purple compound. The purple band on the chromatogram was eluted to give 12.40 grams of solids, and evaporated to dryness along with the methanol extracts from above. The tarry residue from the methanol filtration above was run through an $Al_2O_3$ (F–1 grade) column with chloroform. The forerun, prior to the main purple band, was yellow; but upon exposure to sunlight or artificial light, the solution immediately darkened to a deep purple. The eluates were collected and evaporated. The solids from the purple band were combined with the purple band from the chromatographing of the Soxhlet extracts above. All residues from the Soxhlet extractions were dissolved in chloroform and chromatographed on F–20 grade alumina. A single gray-black band moved down the column slowly; the forerun eluate-1 contained the yellow photosensitive compound; when the main band started eluting, eluates 2 and 3 were taken, but exhibited no porphyrin spectral bands (wedge filter). Eluates 4, 5, and 6 exhibited strong tetraphenylporphyrin bands and were evaporated to purple residues, which were dissolved in chloroform and re-chromatographed on F–20 grade $Al_2O_3$. The eluates from the main band were collected and evaporated to give 7.26 grams of $\alpha,\beta,\gamma,\delta$-tetraphenylporphin. The light-sensitive foreruns noted above, which were found to be equivalent to zinc tetraphenylporphyrin in photosensitizing photoxidations, were combined to give 12.21 grams of compound. This compound, taken with 5 grams of tetraphenylporphin separated from a residue fraction, makes a total of 39.1 grams of photoxidation catalyst, for a yield of 72.3%. The light sensitive material may be a porphyrin isomer or chlorin which undergoes rapid photoxidation to tetraphenylporphin when exposed to light. Priesthoff and Banks (J. Am. Chem. Soc., 76, 937 (1954)), obtained 18% yield when pyridine was included as solvent.

EXAMPLE 16

In a Pyrex Carius tube were placed 10 grams of zinc acetate, 13 ml. of benzaldehyde, 5 grams of benzoic acid, 11 ml. of pyrrole, and 20 ml. of pyridine. The tube was flushed with nitrogen, sealed, and heated at 200° C. for 48 hours. The tube was opened and the tetraphenylporphin was isolated by extraction and chromatographic procedures similar to those of Example 15; however, the yield of tetraphenylporphin was only 7%. When pyridine was omitted, but 4.2 grams of benzaldehyde and 14.6 grams of benzoic acid were employed, only a trace of tetraphenylporphin was obtained.

EXAMPLE 17

Four Pyrex Carius tubes were charged with porphyrin-forming reactants as individually described below, flushed with nitrogen, sealed and heated at 200° C. for 48 hours in a Carius furnace. The contents of the tubes were then removed, either mechanically or by solution and evaporation of the solvent.

*Tube A.*—The charge to tube A was 34 ml. (0.32 mole) benzaldehyde and 11 ml. (0.16 mole) pyrrole. The charge did not include any solvent, nor did it include any zinc salt as catalyst. After decantation of reaction water, the amount of reaction product was 42 grams compared to the total charge of 45 grams. A 2.000-gram portion of the reaction product was dissolved in chloroform and chromatographed on a large F–1 $Al_2O_3$ column to give the following eluates: (1) An amber material which darkened somewhat on exposure to light, 0.845 gram (by weight); spectral analysis disclosed prominent tetraphenylporphin bands. (2) A light amber material which was light-sensitive and gave less prominent tetraphenylporphin bands, 0.209 gram. (3) A green-brown material which exhibited no tetraphenylporphin bands, 0.932 gram; this material probably results from the excess benzaldehyde reactant. The three eluates represent a 99.3% recovery of the chromatographed material. Eluates 1 and 2 appear to be a mixture of $\alpha,\beta,\gamma,\delta$-tetraphenylporphin and its light-sensitive "isomer," eluate 2 being mostly the light-sensitive isomer. As the light-sensitive isomer is photocatalytically active, as indicated hereinbefore, the yield of active material is 90% of the theory. It is thus clearly shown that improved results are obtained in the absence of solvent. It is also shown that zinc salt or similar condensing agent is not required for the reaction, and that a 2:1 molar ratio of aldehyde to pyrrole is very satisfactory.

*Tube B.*—The charge to tube B was 17 ml. (0.16 mole) benzaldehyde, 11 ml. (0.16 mole) pyrrole, and 10 grams $Zn(OAc)_2 \cdot 2H_2O$. No solvent was included. The 38-gram charge produced 35.4 grams of reaction product, after decantation of reaction water. A portion of the reaction product (2.000 grams) was chromatographed as described in the procedure for tube A. The first eluate contained 0.178 gram of an amber material which darkened upon exposure to light. The second eluate contained a pale yellow material, 0.318 gram, which turned purple on exposure to light; spectral analysis showed bands at 565m$\mu$, and 490 m$\mu$. Collection of the third eluate containing the maroon zinc tetraphenylporphin was started when the 550 m$\mu$ band appeared in the eluate; 0.860 gram of the compound was obtained. The yield of zinc tetraphenylporphin (third eluate) was 56% of theory, and the total yield of photocatalytically active porphyrin was 88%. This again demonstrates the value of a solvent-free preparation. The condencing agent in this procedure was useful in permitting isolation of the zinc tetraphenylporphin in very high yield.

*Tube C.*—The charge to tube C was 51.3 ml. (0.48 mole) benzaldehyde and 11 ml. (0.16 mole) pyrrole. The 62-gram charge produced 58.6 grams of reaction product after removal of water. A portion, 2.000 grams, of the product was dissolved in 50 ml. chloroform and chromatographed on F–20 $Al_2O_3$. The second eluate, 0.54 gram, consisted mostly of tetraphenylporphin; this is a 64.4% yield of the material. The third, fourth and fifth eluates contained light-sensitive "isomer" and together with the second eluate would amount to more than a 100% yield; this indicates that the product was contaminated to some extent with the excess benzaldehyde.

*Tube D.*—The charge to tube D included 27.3 ml. (0.20 mole) 1-naphthaldehyde and 11 ml. (0.16 mole) pyrrole. A 2.000-gram portion of the reaction product was dissolved in 50 ml. chloroform and chromatographed on F–20 $Al_2O_3$. The first eluate of slightly light-sensitive material exhibited strong porphyrin bonds; the amount of this $\alpha,\beta,\gamma,\delta$-tetrakis(1-naphthyl)porphin was 0.370 gram for 24.5% of theory. The second eluate contained a light-sensitive material, 0.218 gram, with weak porphyrin bands, and the third eluate contained 0.13 gram of light-sensitive material with bands circa 500 m$\mu$ and 560 m$\mu$. The total catalyst material constituted 47.5% of the theoretical yield of porphyrin. The yields of both total catalyst material and isolated $\alpha,\beta,\gamma,\delta$-tetrakis(1-naphthyl)porphin are much larger than can be obtained when solvents are used in the preparation. Moreover, the yields could be improved by employing pure naphthaldehyde and pyrrole as starting materials. In addition, a fifth eluate fraction of 1.02 grams of brown material exhibited definite porphyrin bands, and rechromatographing would yield additional $\alpha,\beta,\gamma,\delta$-tetrakis(1-naphthyl)porphin.

The aldehydes and pyrrole utilized in this example were not redistilled prior to use.

The solvent-free preparation is applicable in general to the preparation of porphyrins by the reaction of pyrroles and aldehydes. The reaction in bulk improves the yields in the reactions of pyrroles with aromatic, aliphatic, alicyclc, and heterocyclic aldehydes, and all of the resulting porphyrins have photocatalytic properties. However, the solvent-free process is particularly valuable in the preparation of meso-aryl porphyrins of the type disclosed and claimed herein as photocatalysts in photoxidation procedures. In the solvent-free reaction of aryl aldehydes and pyrroles, aryl aldehydes in general and pyrroles in general can be used. For example, any of the pyrrole and phenyl or substituted phenyl reactants necessary to obtain any of the meso-aryl porphyrins disclosed herein, either specifically or by inclusion in a generic class, can be reacted by the solvent-free procedure of the present invention with improved results; as aliphatic aldehyde reactants, the 1-oxoalkanes are preferred, particularly those containing 1 to 8 carbon atoms, for example, acetaldehyde, isobutyraldehyde, formaldehyde, hexaldehyde, etc.

My novel preparation of porphyrins is conducted by simply heating the pyrrole and aldehyde together. The reaction is ordinarily conducted in a sealed tube under autogenous pressure at temperatures sufficient to cause conversion to porphyrins, for example, at temperatures of the order of about 150° to about 250° C. for about 5 to about 75 hours. It is preferred to conduct the reaction in the presence of a condensing agent, such as an inorganic salt or oxide. Any metal ions known to chelate porphyrins are suitable, including metal ions of groups I, II and III and the transition metals, for example, Mg, Ca, Cu, Li, Ag, Pb, Ba, Fe, Ni, Co, Cr, Na, Al, etc. For example, zinc salts and oxides are very suitable for this purpose, particularly zinc acetate and zinc oxide. The contemplated inorganic salts include the metal salts of organic acids as well as the metal salts of inorganic acids. In addition to the foregoing illustrative conditions, any of the known methods for conducting the condensation of pyrroles and aldehydes to porphyrins in solvent media can be employed in my improved solvent-free condensation of pyrroles and aldehydes to porphyrins. The mole ratio of aldehyde to pyrrole can vary greatly, for example, from less than 1 up to 3 or more moles of aldehyde for each mole of pyrrole. As pyrrole is expensive, it is ordinarily desirable to employ at least about 1 mole of aldehyde for each mole of pyrrole, and it is preferred to employ no more than about 2 moles of aldehyde for each mole of pyrrole.

The meso-naphthyl porphyrins are new compounds which were not known prior to the present invention. The meso-naphthyl porphyrins are very valuable photocatalysts. In addition, the naphthyl groups enhance the oil solubility of the compounds and make them useful in some media where less oil-soluble aryl porphyrins would not be very effective.

What is claimed is:

1. A process for introducing oxygen into an organic compound which comprises simultaneously subjecting an organic compound capable of adding oxygen under the influence of light and a photosensitizing catalyst to light irradiation and contact with oxygen and an $\alpha,\beta,\gamma,\delta$-tetraarylporphyrin, thereby introducing oxygen into the molecule of the said organic compound without destruction thereof.

2. The process of claim 1 in which the organic compound is contacted with air.

3. The process of claim 2 in which the catalyst is an $\alpha,\beta,\gamma,\delta$-tetraphenylporphyrin.

4. The process of claim 2 in which the organic compound is irradiated with light in the range of about 3600 to about 8000 Angstroms.

5. The process of claim 4 in which an olefin is oxidized to a peroxide.

6. The process of claim 4 in which an aliphatic monoolefin is converted to an aliphatic hydroperoxide.

7. The process of claim 1 in which the catalyst is $\alpha,\beta,\gamma,\delta$-tetrakis(2,4-dichlorophenyl)porphin.

8. The process of claim 1 in which the catalyst is $\alpha,\beta,\gamma,\delta$-tetrakis(3,4-dichlorophenyl)porphin.

9. The process of claim 1 in which the catalyst is $\alpha,\beta,\gamma,\delta$-tetrakis(1-naphthyl)porphin.

10. The process of claim 1 in which the catalyst is $\alpha,\beta,\gamma,\delta$-tetrakis(4-methylphenyl)porphin.

11. The process of photoxidizing an olefin comprising propylene trimer to its hydroperoxide which comprises contacting said olefin with oxygen, $\alpha,\beta,\gamma,\delta$-tetraphenylporphin catalyst and light, thereby introducing oxygen to form the said hydroperoxide.

References Cited in the file of this patent

UNITED STATES PATENTS

| 2,165,130 | Coe | July 4, 1939 |
|---|---|---|
| 2,681,344 | France | June 15, 1954 |
| 2,732,337 | Togel | Jan. 24, 1956 |